United States Patent [19]

Milling

[11] 3,886,478

[45] May 27, 1975

[54] MULTI-COMPONENT FLOW INJECTOR PUMP FOR A FLOWING GAS LASER WITH LOW OUTPUT PRESSURE

[75] Inventor: Robert W. Milling, Dayton, Ohio

[73] Assignee: The Unites States of America as represented by the Secretary of the Air Force, Washington, D.C.

[22] Filed: Nov. 5, 1973

[21] Appl. No.: 412,856

Related U.S. Application Data

[63] Continuation-in-part of Ser. No. 319,590, Dec. 29, 1972, abandoned.

[52] U.S. Cl. ............... 331/94.5 G; 330/4.3; 60/93; 60/64; 331/94.5 T
[51] Int. Cl. ............................................. H01s 3/22
[58] Field of Search ......... 331/94.5; 330/4.3; 60/93, 60/207, 208, 264, 269, 271, 64

[56] References Cited
UNITED STATES PATENTS
3,046,732   7/1962   Foa ..................................... 60/35.6
3,688,215   8/1972   Spencer et al. ..................... 331/94.5

*Primary Examiner*—William L. Sikes
*Assistant Examiner*—R. J. Webster

[57] ABSTRACT

A pumping system for a chemical laser having a heat exchanger in the output for supplying heat to the diluent carrier gas from a high pressure gas supply. The diluent carrier gas is used to accelerate solid particles which are then separated from the gas stream and used to accelerate the output gas of the laser. The kinetic energy of the gas stream is then converted to a gas stream pressure in an expanding channel. The solid particles are then removed from the gas and returned to the particle supply.

4 Claims, 1 Drawing Figure

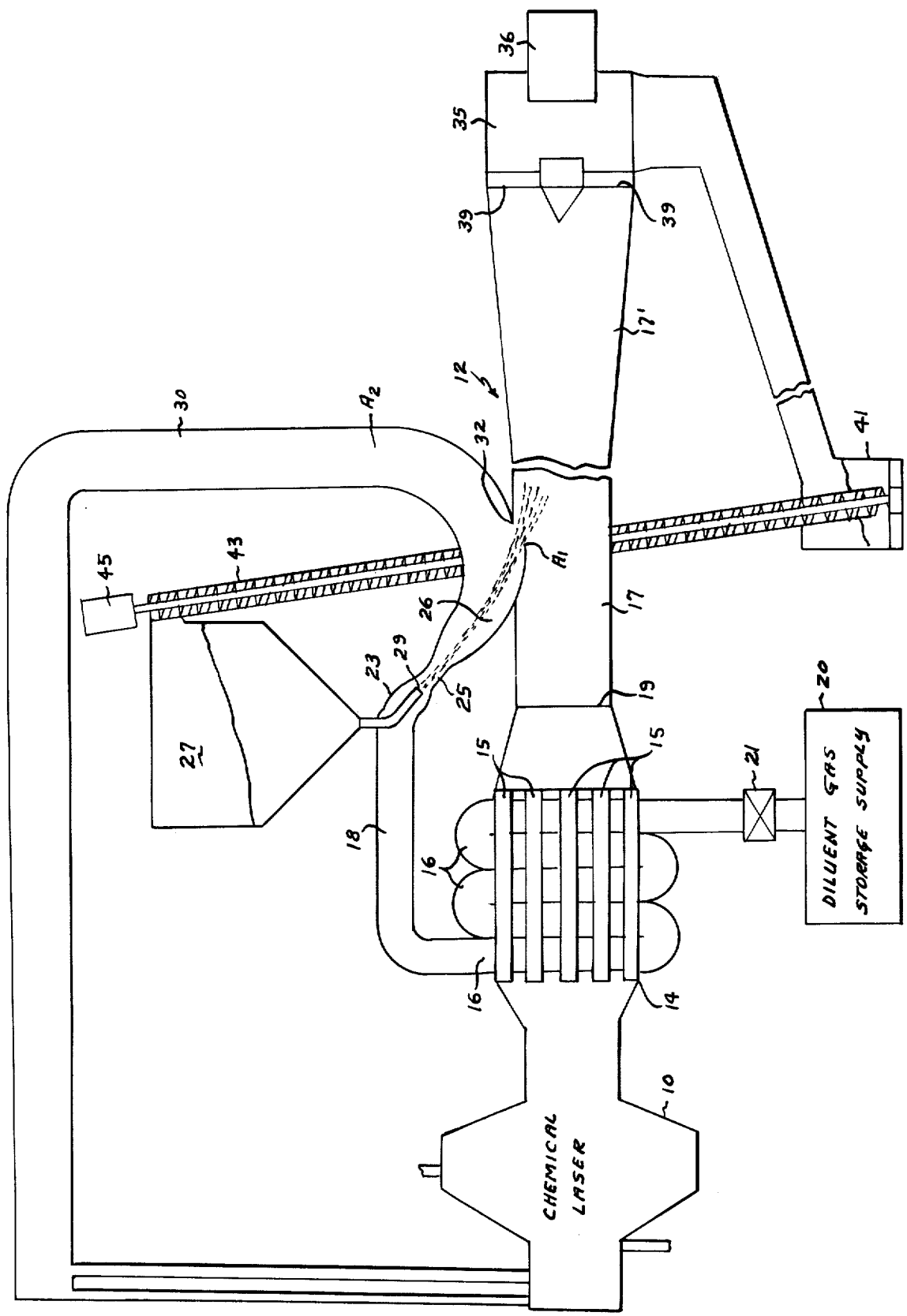

MULTI-COMPONENT FLOW INJECTOR PUMP FOR A FLOWING GAS LASER WITH LOW OUTPUT PRESSURE

CROSS REFERENCE TO RELATED APPLICATIONS

This is a continuation-in-part of my application "Multi-Component Flow Injector Pump for a Flowing Gas Laser with Low Output Pressure," Ser. No. 319,590, filed Dec. 29, 1971 now abandoned.

BACKGROUND OF THE INVENTION

Chemical lasers, and other flow type lasers, have the capability of producing high energy laser beams from systems of small weight and volume. However, these systems operate at such low pressures that substantial amounts of pumping equipment must be added to exhaust the flowing gases, to the atmosphere. The accessory pumps are often many times the size and weight of the laser itself.

BRIEF SUMMARY OF THE INVENTION

According to this invention, use is made of the fact that the primary gas stream in the laser is about 90 percent diluent gas, such as nitrogen or helium, which is normally stored at several thousand pounds per square inch pressure and that this gas is normally used at a pressure of about 100 pounds per square inch. This pressure difference is used to accelerate solid particles which, after separation from the diluent gas, are used in injector fashion to pump the laser output gas flow up to atmospheric pressure by well-known momentum exchange process.

IN THE DRAWING

The single FIGURE of the drawing is a schematic diagram partially in block form of a laser output pumping system according to the invention.

DETAILED DESCRIPTION OF THE INVENTION

Reference is now made to the drawing which shows a chemical laser 10 with an output pumping system 12. The output of laser 10 is supplied to a heat exchanger 14 wherein the laser output passes through channels 15 and the diluent gas passes through channels 16 and then to an output channel 18. The stored diluent gas, such as helium, is stored at approximately 500 atmospheres in storage supply 20. The gas from supply 20 is supplied to the heat exchanger 14 through a control valve 21. After passing through the heat exchanger, the helium gas is passed through a conventional converging-diverging nozzle 23. The gas is accelerated to a high velocity of about Mach 4 in the expansion region 25 of nozzle 23. Solid particles, such as small glass beads, with a size, of the order of 10 microns, from supply 27 enter the gas stream through tubular member 29 and are accelerated to a high velocity in the gas stream in region 25 by the well-known energy exchange process. See for example the patent to Johnson et al., 3,739,634.

After leaving the region 25, the stream is turned at 26 where the resulting inertial force field causes the solid particles to be centerfuged out of the helium gas stream so that the helium gas passes out through conduit 30 to be supplied as a carrier gas in laser 10 in the normal manner.

The separated solid particles pass through opening 32 into channel 17 and are introduced into the laser output stream. The particles increase the velocity of the laser stream through the well-known momentum exchange process. The cross-sectional area of channel 17 is increased to convert the kinetic energy of the gas to a gas stream pressure near atmospheric pressure so that the stream can then be exhausted to the atmosphere through a conventional particle separator 35 and output tube 36. The particle separator may be a conventional vortex type separator with swirl vanes 39 in the input, such as described in the U.S. Pats. to Kamrath, U.S. Pat. No. 1,746,218; Griffin, U.S. Pat. No. 2,506,298; or Poplowski, U.S. Pat. No. 3,421,299.

The solid particles are returned to the particle supply by any well known means. One such means is shown wherein the solid particles are collected in collector tank 41 and returned to supply 27 by means of a worm conveyor 43 driven by a motor 45.

In the operation of the device, the output of the laser 10, which operates in a conventional manner, is passed through the heat exchanger 14 to give up its heat to the diluent gas from supply 20 and then passes out through channel 17.

The diluent gas leaving heat exchanger 14 passes through channel 18 to the converging-diverging nozzle 23 wherein it is accelerated to a velocity of about Mach 4 and a static pressure of the same order of magnitude as in channel 17. The solid particles from supply 27 enter the stream in nozzle 23 and are accelerated to a high velocity near stream velocity by energy exchange in the region 25 wherein the gas is expanded to a high supersonic velocity. The particle stream does not expand a great amount between member 29 and the opening 32, due to the mass of the particles and the focusing effect of the gas stream. The size of the opening 32 is made only large enough to pass the expanded particle stream. The area $A_1$ of the opening 32 is very small with respect to the area $A_2$ of conduit 30. Normally, the ratio $A_1/A_2$ would be of the order of 0.005. The channel is turned at 26 to centerfuge the solid particles out of the gas stream. As the flow is turned, the solid particles tend to drift to the outer wall of the curved portion of channel and pass through the opening 32 into the conduit 17. The gas passes to the laser 10 through conduit 30. A pseudo shock system will develop in channel 30 where the supersonic flow will become subsonic with a resultant rise in static pressure. A pressure reduction system may be provided in line 30, if desired, to provide the required pressure for the input gas to the laser. The flow of particles through opening 32 prevents any significant loss of gas through this opening.

The solid particles, separated from the gas, enter channel 17 through opening 32 at a supersonic velocity. The gas in duct 17 is also moving at a supersonic velocity but is shocked to a subsonic velocity by the mixing of the flows of solid gas particles. After mixing the velocity of the solid particles remain at supersonic velocity or near supersonic velocity. The length of the interaction space in channel 17 is normally greater than ten times the distance between member 29 and opening 32 to permit the solid particles to disperse throughout a large portion of the channel.

The portion 17' of channel 17, shaped as a conventional diffuser, permits further expansion of the gas to convert gas momentum to a pressure rise in the gas. The continued energy exchange from the particles to the gas acts to reduce the velocity of the particles and to increase the pressure of the laser output flow to a pressure sufficient to pump the gas to the atmosphere. The gas and particle stream then enters the separator 35 through swirl vanes 39 so that the particles are centrifuged out by the vortex flow in separator 35, in a conventional manner. The gas then passes out through passage 36 and the solid particles are collected in collector tank 41, for return to the particle supply 27 by means of worm conveyor 43 or other well known means.

While the particles used have been described as glass beads, other solid particles also could be used. Also, for some applications the particles could be water droplets which will freeze during the expansion in region 25. These solid particles would then provide additional cooling in the output of the laser and could pass to the atmosphere with the gas so that no particle separator or return system would be needed.

Also, though only a single particle stream is shown, in some systems more than one such system for directing particles into channel 17 may be desired.

There is thus provided a system for pumping the output of a chemical laser which makes use of the heat in the laser output gas and the pressure difference between the carrier gas supply pressure and the usable pressure of the diluent carrier gas.

I claim:

1. A gas flow pumping system for a laser having a low pressure output flow, comprising: a high pressure diluent carrier gas supply; means for supplying a flow of said carrier gas to said laser; a heat exchanger having a first flow path connected in the gas flow output of the laser; said carrier gas supplying means including means, for passing the gas from said high pressure supply through a second gas flow path through said heat exchanger; means for accelerating the output gas, from the second gas flow path of the heat exchanger, to a supersonic velocity; means for supplying solid particles to the supersonic velocity flow of gas between the heat exchanger and the laser, for accelerating said particles to a high velocity; means for separating said particles from the flow of carrier gas to said laser; means for directing said separated high velocity particles into the output gas flow of the laser to thereby accelerate the output flow of the laser to a high velocity flow by energy exchange from the particles to the laser output flow; means for converting the kinetic energy of the accelerated laser output gas flow to a gas stream pressure increase.

2. The device as recited in claim 1 wherein the particles are glass beads; means, for separating the solid particles from the gas stream and means for returning the solid particles to the particle supplying means.

3. The device as recited in claim 2 wherein the means for separating the solid particles from the carrier gas flow comprises means for bending the gas flow whereby the solid particles are centrifuged out of the gas flow; means, adjacent the means for bending the gas flow, for admitting the particle flow to the flow of output gas from the laser.

4. The device as recited in claim 3 wherein a converging-diverging nozzle is located in the laser gas supplying means between the heat exchanger and the means for bending the gas flow; said solid particles being supplied to the flow within the converging portion of the nozzle whereby the solid particles are accelerated to a high velocity by energy exchange in the diverging portion of the nozzle.

* * * * *